(12) United States Patent
Marsh et al.

(10) Patent No.: US 7,209,447 B1
(45) Date of Patent: Apr. 24, 2007

(54) METHOD AND APPARATUS FOR MEASURING PACKET CONNECTION QUALITY OF SERVICE

(75) Inventors: Anita Brady Marsh, Oswego, IL (US); Dale Alan Scholtens, Stickney, IL (US)

(73) Assignee: Tellabs Operations, Inc., Lisle, IL (US)

(*) Notice: Subject to any disclaimer, the term of this patent is extended or adjusted under 35 U.S.C. 154(b) by 666 days.

(21) Appl. No.: 09/615,287

(22) Filed: Jul. 13, 2000

(51) Int. Cl.
*G01R 31/08* (2006.01)

(52) U.S. Cl. ............... 370/237; 370/229; 370/232; 370/234

(58) Field of Classification Search .......... 370/229, 370/230, 230.1, 231, 232, 233, 234, 235, 370/395.52, 395.51, 395.21, 395.2, 395.3, 370/395.31, 395.41, 395.42, 395.43, 237, 370/252
See application file for complete search history.

(56) References Cited

U.S. PATENT DOCUMENTS

| | | | | |
|---|---|---|---|---|
| 5,309,431 | A | * | 5/1994 | Tominaga et al. |
| 5,963,551 | A | | 10/1999 | Minko |
| 6,064,654 | A | * | 5/2000 | White-Hauser ............. 370/248 |
| 6,144,636 | A | * | 11/2000 | Aimoto et al. .............. 370/229 |
| 6,178,235 | B1 | * | 1/2001 | Petersen et al. ............ 379/134 |
| 6,308,209 | B1 | * | 10/2001 | Lecheler ..................... 709/224 |
| 6,314,105 | B1 | * | 11/2001 | Luong ..................... 370/395.2 |
| 6,438,104 | B1 | * | 8/2002 | Fodor et al. ................ 370/230 |
| 6,480,468 | B1 | * | 11/2002 | Kishigami et al. ........ 370/230.1 |
| 6,510,219 | B1 | * | 1/2003 | Wellard et al. ......... 379/221.01 |
| 6,570,846 | B1 | * | 5/2003 | Ryoo .......................... 370/229 |
| 6,678,250 | B1 | * | 1/2004 | Grabelsky et al. .......... 370/241 |
| 6,700,895 | B1 | * | 3/2004 | Kroll .......................... 370/412 |
| 6,771,594 | B1 | * | 8/2004 | Upadrasta ................... 370/228 |
| 6,822,940 | B1 | * | 11/2004 | Zavalkovsky et al. ...... 370/237 |
| 6,831,895 | B1 | * | 12/2004 | Ji et al. ....................... 370/237 |

* cited by examiner

*Primary Examiner*—Doris H. To
*Assistant Examiner*—Steve Blount
(74) *Attorney, Agent, or Firm*—Banner & Witcoff, Ltd.

(57) ABSTRACT

Telephone conversations carried over an internet protocol network or other asynchronous network can be monitored for quality and rerouted if the error rate of data transmission through the network exceeds some predetermined threshold value. One or more counters in a switching system along a pathway records the occurrence of missing, delayed, or out of sequence cells or data packets over time. At some predetermined threshold value, considered to be an excessive error rate, the switching system can be used to trigger a rerouting of the telephone call or subsequent calls to pathways with better error rates and therefore better transmission quality.

29 Claims, 4 Drawing Sheets

METHOD AND APPARATUS FOR MEASURING PACKET CONNECTION QUALITY OF SERVICE

FIELD OF THE INVENTION

This invention relates to communication networks. In particular, this invention relates to packetized data communication networks.

BACKGROUND OF THE INVENTION

For years, the public switched telephone network of the U.S. has provided reliable two-way telephone service. This network is made up of various types of well-known switching systems and well-known physical media over which are carried electrical signals representing voice-frequency information.

Those skilled in the art know that switching systems of the public switched telephone network synchronously route electrical signals in the form of bi-polar, binary-valued pulses that represent samples of voice frequency information. Telephone conversations, which by their nature require immediate transmission, are adequately carried over synchronous networks, which, by definition, carry data at a fixed rate. In addition to carrying digitized voice communications however, the public switched telephone network also carries data of the kind that is created and used by computers.

While the synchronous public switched telephone network provides very reliable communications for both voice and data, there are now several different kinds of asynchronous data networks that are intended to carry primarily data (not necessarily representing speech) but which are now being considered to carry telephone calls much as the public switched telephone network does. Some of these data networks include Ethernet networks, asynchronous transfer mode (or "ATM") networks, Internet protocol (or "IP") networks and frame relay networks, among others. They all share a few characteristics: data is sent in discrete bundles or packets and the packets are sent asynchronously as opposed to synchronously.

In order to carry acceptable voice quality telephone calls or voice traffic, which require near-zero latency variation between the voice sample transmissions, an asynchronous network must be set up so as to allow digitized voice samples to be reliably and repeatedly routed through the network and delivered to a destination on time so that a person's utterances that are reconstructed from recovered data packets is at least a reasonable facsimile of the speaker's actual voice. Inasmuch as those skilled in the art know that any band-limited time-varying signal that is sampled at a sufficiently high rate can be perfectly reconstructed from the samples but only if all of the samples are delivered and delivered on time and in the proper sequential order, dropping or losing data samples that represent an analog signal will degrade the reproduction quality of digitized signal. When voice samples are carried over an asynchronous network, even delaying a voice sample will degrade signal reproduction. As voice samples are delayed or lost on an asynchronous data network, reproduction quality gets increasingly worse. A method and apparatus by which the transmission quality of service through an asynchronous network might be measured might be a valuable tool in insuring voice quality when an asynchronous network is used to carry telephone traffic.

SUMMARY OF THE INVENTION

In addition to carrying data representing internet web page content, e-mail and other information files, asynchronous data networks can be used to carry voice information (e.g. telephone conversations). When an asynchronous data network is used to carry telephone traffic or voice signals, data packets representing speech or voice information can be unacceptably delayed and sometimes lost, significantly degrading voice reproduction quality.

A method and apparatus for measuring packetized-data transmission quality (also known as transmission quality of service or "QoS") packet-based network determines when transmission quality has degraded to a point where a new pathway through the network is required. When network transmission quality, as measured by lost, missing or delayed packets, exceeds a threshold, subsequent data packets or subsequent telephone calls can be routed over a different pathway through the network, one preferably having better data transfer capability.

In the preferred embodiment, data network transmission quality is determined by counting voice data packets travelling over a pathway during a predetermined time interval. Because data packets representing speech (like in a telephone call) must be received substantially synchronously in order to preserve voice reproduction quality, when the voice data packet reception rate or count value over a predetermined time period varies from a predetermined expectation, call already in progress or subsequent calls can be routed through the network over another pathway.

DETAILED DESCRIPTION OF THE PREFERRED EMBODIMENT

Figure 1:
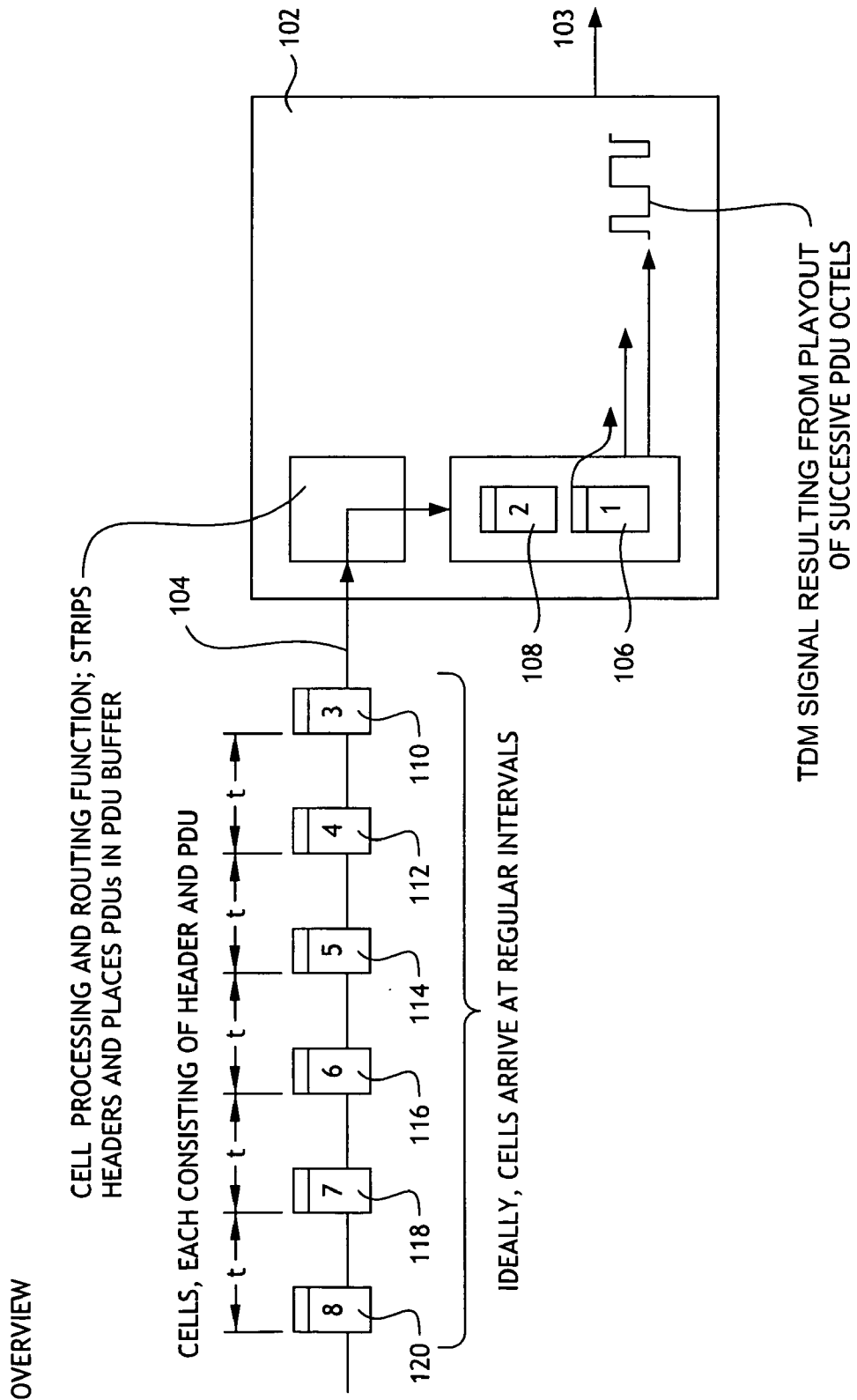
FIG. 1 shows a simplified block diagram of an asynchronous switching system and the delivery of data packets over a transmission media to the switching system.

With respect to FIG. 1, there is disclosed a portion of a data network 100 comprised of an asynchronous switching system 102 to which data packets (106, 108, 110, 112, 114, 116) are delivered via a conventional media 104 such as a coax or fiber optic cable, unshielded twisted pairs or perhaps a radio frequency signal in free air. The data packets of the preferred embodiment represent several individual, digitally encoded speech or voice samples of a voice or speech information as part of a telephone call being routed through the network 100 between two endpoint switches, not shown in FIG. 1. (Alternate embodiments would of course include data packets that are the actual voice samples instead of bundles of voice samples sent as a packet.) The data packets received at the switch 102 are received at switching system 102 input port (not shown) and routed out of the switch 102 via an output port (not shown) to which is coupled an output transmission line 103 by which the data packets are sent to a destination at which the original speech signals are reconstructed.

As shown in FIG. 1, the various data packets 106, 108, 110, 112, et seq. are shown as being temporally spaced apart at substantially uniform time intervals, t. Stated alternatively, each of the data packets shown are uniformly spaced in time such that each of the data packets arrives at the switching system 102 nearly synchronously.

Switching system 102 could be any of a number of types of asynchronous switching systems. In the preferred embodiment, switching system 102 is an internet protocol (IP)switch but may also be an asynchronous transfer mode (ATM) switching system or other system sending packetized data such as an Ethernet network. The switching system 102 might also be a frame relay switching system or perhaps an Ethernet hub.

When the data packets 106, 108, 110, etc. arrive at the switching system 102 at predicted intervals, t as shown, they are preferably re-routed by the switching system 102 onto an out-bound data channel or media 103 for subsequent routing to another switch. Eventually the data packets are used to recreate the original voice-frequency signal which the data packets are encoded to represent samples of.

Figure 2:
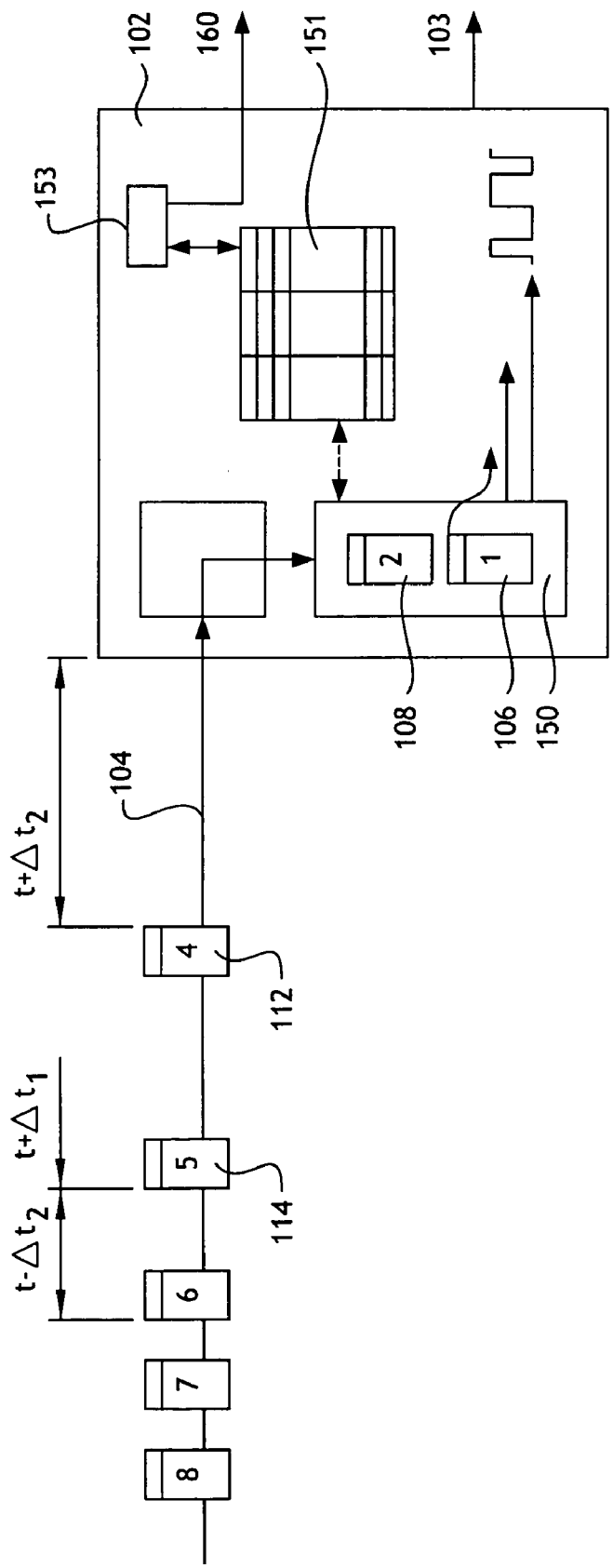
FIG. 2 shows a simplified block diagram of an asynchronous switching system and the asynchronous arrival times of data packets which might represent voice samples.

Carrying speech signals for a telephone call or other voice transmission through an asynchronous network (so called "voice over IP" or "VoIP" networking) is problematic however when the voice samples represented by the data packets 106, 108, 110, 112 etc. do not arrive at the switching system synchronously or at predicted or expected intervals as shown in FIG. 2. When voice information is routed over an internet protocol, ATM or other packetized data network the asynchronous nature of the network cannot guarantee the timely arrival of a data packet at a destination because network loading and pathway reconfigurations, among other factors, affect the ability of an asynchronous network to function properly to carry voice signals. When data packets representing voice frequency information samples are lost, delayed or delivered out of order, voice reproduction quality suffers.

In FIG. 2, the switching system 102 depicted in FIG. 1 is shown having received two data packets 106 and 108, both of which are comprised of binary data that represents voice information. Data packet 106 is arbitrarily denominated in FIGS. 1 and 2 as the first data packet of a series of voice frequency data packets or cells, which is followed by series of similar packets or cells, each of which carries additional encoded audio signal information.

As can happen in an asynchronous data network, such as a VoIP network, the third voice packet 110 (as shown in FIG. 1) is missing from the voice packet sequence shown in FIG. 2. In addition to having lost packet #3, the fourth voice frequency packet (identified by reference number 112) is substantially delayed from the second voice packet by an amount equal to t+Δt$_2$. In other words, of the first four voice data packets that represent a voice frequency signal or speech, one of them is completely missing and the fourth packet is substantially late, with respect to the packets preceding it. Depending upon various factors discussed below, accurately reproducing the speech represented by the samples might be impossible.

The fifth data packet (represented by reference numeral 114) is also delivered late with respect to voice packet no. 4 by an amount equal to t+Δt$_1$. Voice samples 6, 7 and 8 arrive ahead of schedule by an amount equal to t−Δt$_3$. (An alternative way of viewing the arrival time of samples 6, 7, and 8 is that all of samples 5, 6, 7, and 8 were delayed somewhere and that thereafter they are bunched together when they arrive at the switching system by a time t−Δ3.")

When data cells (also known as packets) that speech arrive at irregular intervals, the delivery time irregularity can sometimes be hidden by a playout buffer 150 within the switch 102. If the data cells arrive at a sufficiently high rate, (perhaps by over-sampling the original speech signal) data cells stored in the playout buffer can be played out from the play out buffer (also known as a PDU buffer) 150 at a substantially constant rate, until the buffer is overfilled creating what it known in the art as a buffer overrun. When a buffer overrun occurs, buffer storage space is exhausted; data packets that arrive and for which there is no storage available in the buffer are discarded (lost) and not sent on to be used in reconstructing the original speech signal. At least two ways of dealing with a buffer overrun is to either flush the buffer completely or to flush the buffer half-way. Emptying the buffer completely will enable the buffer to completely refill with newly arriving samples, minimizing the duration of voice interruption. If the buffer is not completely flushed, at least some of the newly arriving samples are likely to be discarded because the buffer will be filled.

Conversely, when data packets arrive too slowly, the time between data packets or data cells 106, 108, 110, 112 etc. that might have been-stored in the read out of the buffer faster than they arrive. Eventually, the buffer completely empties creating an underrun condition. An underrun condition means that there is no data to provide. Voice reproduction suffers because the samples representing the original speech information is completely lost. If only a few packets are lost or so delayed that they can't be used, the reconstructed voice might be intelligible but as the number of lost packets increases, eventually the original signal cannot be recovered. The invention disclosed herein automatically determines voice quality degradation by recording missing packets as well as underrun and overrun conditions.

Switching system 102 includes a counter array 151 (not shown in FIG. 1 or 2) that maintains a history of recent packet or cell processing by the switching system 102. This counter is preferably coupled to and part of a play out buffer 150 and operates under the control of a programmable processor 153 such that the counter 151 can maintain a record of the number of valid data cells or data packets received per unit time.

In the case of significantly delayed data packets, such as the fourth data packet represented by reference numeral 112, the play out buffer 150 might "under run" (i.e. run out of data samples for transmission on pathway 103) before the arrival of the next incoming sample, depicted in FIG. 2 as sample no. 4, identified by reference numeral 112. Similarly when data packets arrive too quickly, as shown by packets 5, 6, 7 and 8 (represented by reference numerals 114, 116, 118 and 120) the play out buffer will over run. The counter array will accumulate buffer over runs to record the fact that the buffer is incapable of storing incoming cells which will in all likelihood be discarded by the switching system 102.

When the number of error conditions (overruns and under-runs and late or missing samples) per unit time becomes excessive, indicating that voice transmission quality is degrading, a flag 160 is generated by the switching system 102 is set indicating that the transmission pathway, including switching system 102 and the media 104, might be incapable of accurately carrying voice data packets. The flag 160 might be an output voltage provided by the switch on some appropriate output connection, however, alternate embodiments would include flat 160 embodied as a software flag set or reset in an appropriate storage device of the switch's controlling processor or ancillary memory.

By way a suitable flat control signal 160 the switching system 102 can notify a network controller—not shown—that some other pathway should be used for subsequent data packets or cells for the call in progress, or that for subsequent telephone calls, a different pathway through the network should be chosen.

Figure 3:
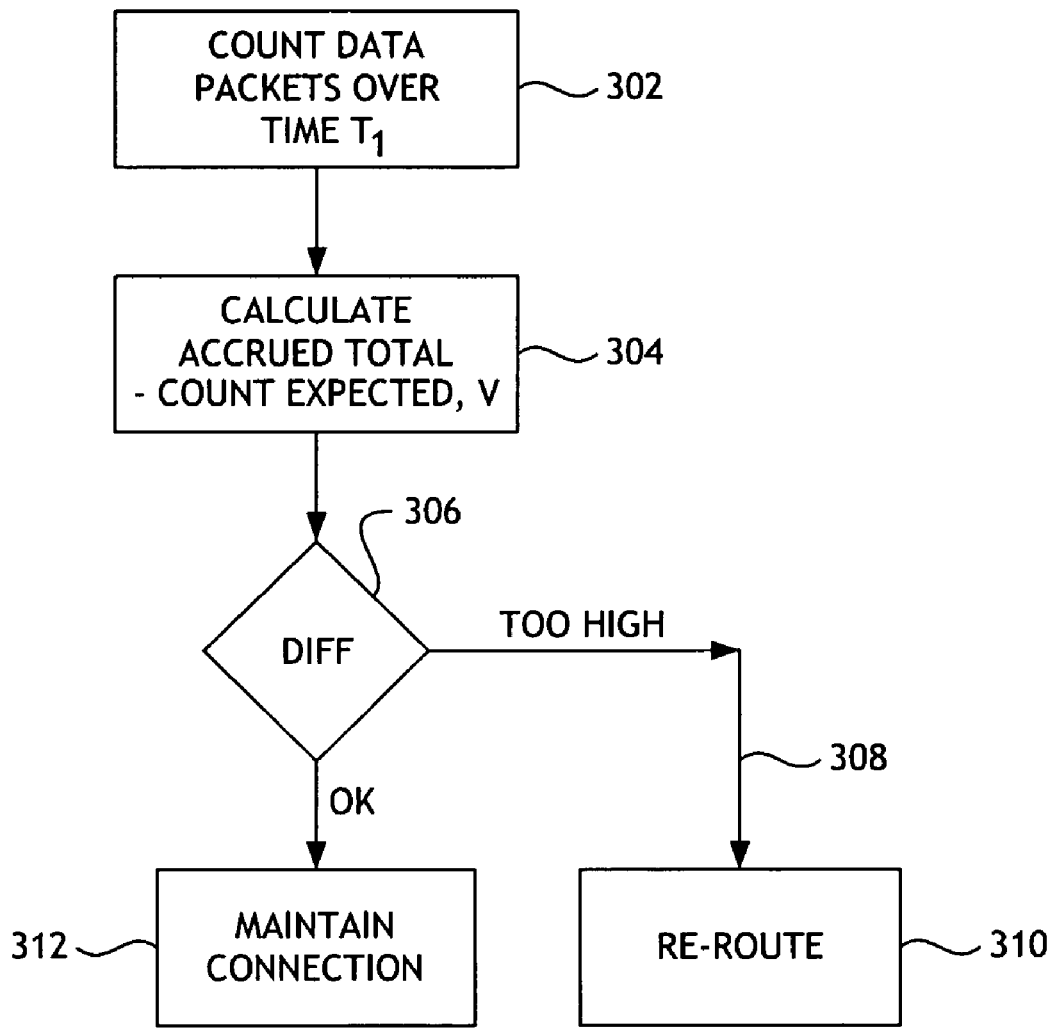
FIG. 3 shows a simplified block diagram of the steps of the method disclosed herein.

The method of the invention is represented by a simplified flow chart shown in FIG. 3. At some predetermined point in a data network that is being operated to carry voice packets or voice cells, voice packets or voice cells should arrive at a nearly synchronous rate by virtue of the nature of voice communications. At some switch in the network, the switching system can begin to count arriving data packets and continue to count packets 302 over a time interval T that is a design choice but represented in FIG. 3 by $T_1$.

So long as the voice packet arrival rate is known, the switching system 102 can assume that a certain number of packets should arrive at the switching system over the time intervals $T_1$. As the number of data packets accrues, at the expiration of time $T_1$, the accrued total amount of data packets that arrived at the time period $T_1$ can be compared to an expected count value 304, excluding any playout buffer overruns which are as problematic as lost data packets. The expected count value V, can be chosen to be a minimum number of voice packets per unit time that produces an acceptable voice quality level. Alternatively it might be chosen to be the value V, of the number of voice packets that would be expected per unit time over a synchronous data network for optimum voice reproduction quality. If the difference 306 between the accrued total number of data packets is substantially below the expected count value "V," a decision can be made that the packet error rate is too high 308 to sustain acceptable quality levels of voice transmission. In such a case, a network controller (not shown in the figures) can be informed to reroute subsequent data packets for this call, or to maintain the connection intact 310 for subsequent calls that might be made between the same two end points. While the preferred embodiment reroutes data packets whenever the data error rate exceeds a predetermined threshold, in an alternate embodiment, the data rate or error rate for a call in progress, might be maintained for the duration of the call 312 but with subsequent telephone calls routed over some other, i.e. different pathway.

In the preferred embodiment, the switching system 102 and the methodology disclosed herein is implemented on a packetized data network, preferably an internet protocol or "IP" network. The invention would find applicability to other packet networks such as ATM networks, frame relay networks, Ethernet networks or an MPLS (multi-protocol level system) network.

So long as one or more switching systems of the network can track error rate or otherwise calculate or determine missing or misplaced data packets, maintaining a record of packet errors over time can be used to reroute subsequent transmissions over another pathway. In at least one embodiment, multiple. switches along a pathway might each track error rates using the methodology disclosed herein and collectively accumulate their error measurement information over the entire pathway or a subpart thereof. In such an embodiment, end-to-end (or part thereof) errors for a telephone call through the asynchronous network could be calculated so that a better picture of the transmission quality could be determined.

In the preferred embodiment, data packets are received at the switching system at a play out buffer of an internet gateway. Such a device readily keeps track of over run and under runs both of which can be considered error conditions effecting voice reproduction quality.

Those skilled in the art should recognize that voice packets need to arrive at a substantially continuous rate, but on average arrive at between 5–10 milliseconds apart a corresponding 5–10 ms. sampling rate. A 20 ms. sampling rate means that voice packets will arrive roughly every 20 milliseconds. The count value over some length of time by which an error condition can be determined is therefore operator dependent. A determination that two temporally adjacent data packets are missing or out of order might not seriously degrade voice reproduction quality nor will losing individual samples over a long period of time. The inventors have determined that losing approximately 1% of 6 ms samples of a 64 KBPS uncompressed voice stream does not noticeably affect voice quality. Inasmuch as acceptable voice quality is subjective, different subscribers might be willing to pay higher service rates is a service provider is able to guarantees higher levels of voice quality. A more lengthy time interval over which packets are counted may be preferable to determine voice transmission quality over an IP network.

In the preferred embodiment the data packets were expected to arrive at the switching system at approximately 5–10 millisecond intervals.

It should be apparent that with the advent of the internet, and widespread use of other data packet networks that were primarily intended to handle computer data, that it might be possible to carry telephone conversations over such networks if they can be set up or provisioned such that voice samples are routed through the network with a reasonable expectation that they can be delivered between a source and a destination in order and in ample time to allow real time conversations to take place.

By monitoring the voice transmission quality through an asynchronous network as measured by missing, out of order or delayed packets, a real time metric of the quality of service through a data network can be determined.

Figure 4:
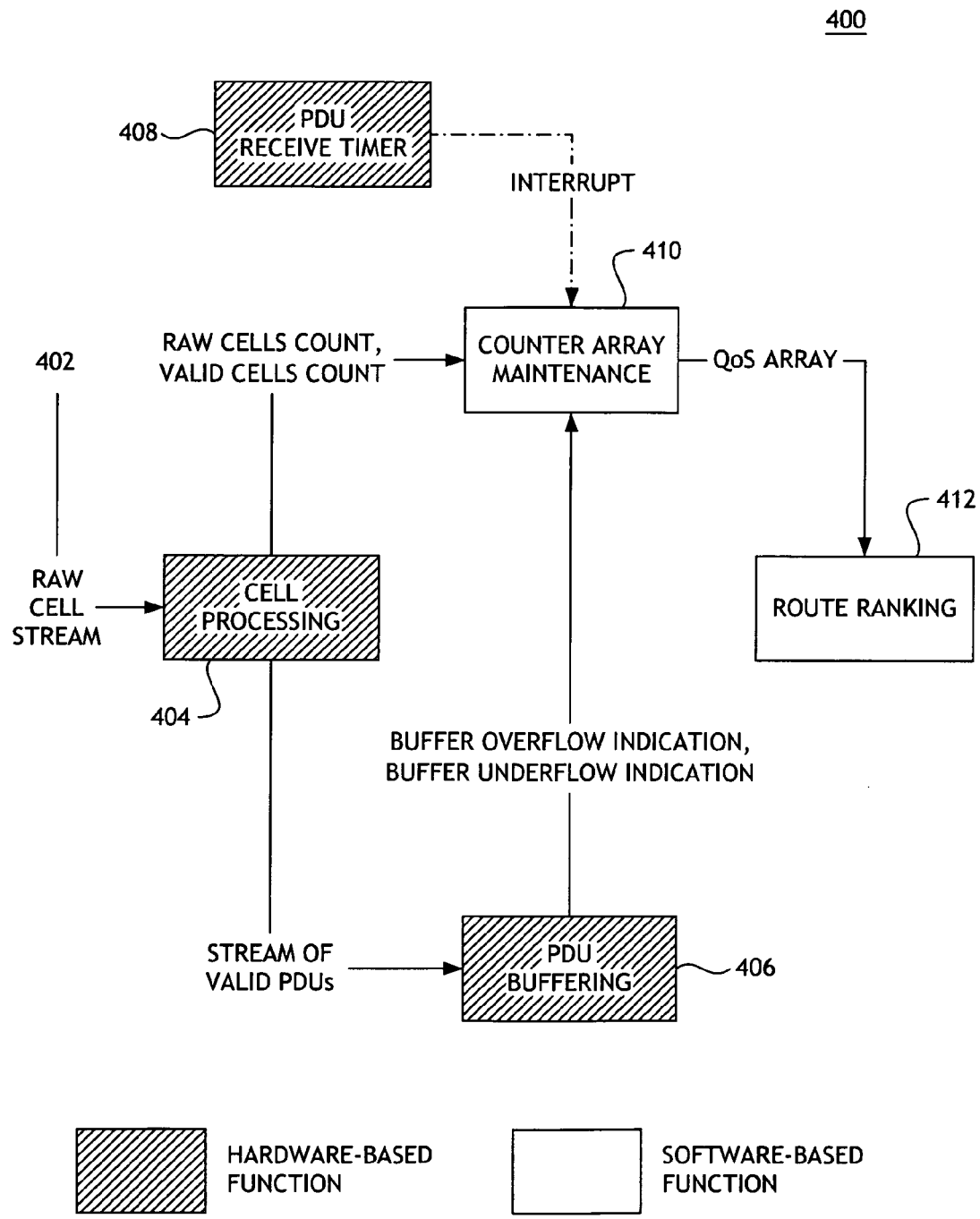
FIG. 4 shows a simplified block diagram of the functional elements of a switching system that perform the functions of the method disclosed in claim herein.

FIG. 4 shows an exemplary depiction of the components and functions of a switching system 400 that perform the steps of the method described herein. Incoming data packets 402, whether valid or invalid are counted and tested for validity in a cell processing unit 404, preferably implemented in hardware using discrete devices such as counters, timers and registers, but also possibly done in software by a suitably fast processor. Among the characteristics that might be measured are the data packet bit count and/or byte count, the presence or absence of a header, as well as a variety of other characteristics including pulse-position jitter and the time between packets.

Valid data packets are forwarded to a hardware-based playout data buffer or PDU 406 which could be implemented using any appropriate memory device such as a random access memory or the like. Invalid data packets, which might include data packets with checksum errors, missing header files or packets that are otherwise lost or corrupted are deleted. Data packets from the PDU 406 can be forwarded to anther switching system. One or more timers, preferably implemented in software but also performed using discrete hardware functions, reads data from the cell processing unit 404 and the PDU 406.

For each connection being monitored, a PDU timer 408 periodically triggers software-based counters 410 of the activities performed by the cell processing unit 404 so as to accumulate or total incoming packet error counts. These software-based counter arrays 410 obtain cell counts from the cell processing hardware; obtain overrun and underrun counts from the PDU 406; enables aged entries in the PDU 406 to be overwritten and establishes the quality of service ranking for a connection based upon the number of cells received versus the number of cells expected. The average of the quality of service calculation for each set of connections associated with a route is used in subsequent routing decisions by sending the quality of service measurement results to a software-based ranking function 412. This QOS ranking can be used as a basis of whether to re-route traffic from a high error-rate pathway to preferably a lower-rate pathway.

From the foregoing it can be seen that by objectively measuring data errors and error rates on a packet-based switching system, voice quality on a packetized network can be maintained. By using the methodologies and apparatus disclosed herein, voice over an internet protocol, Ethernet protocol, asynchronous transfer mode protocol or other asynchronous networks can be significantly improved. Those skilled in the art will recognize that each of the foregoing functions might be performed in software as well as an appropriately fast processor or by combinational and/or sequential logic devices.

We claim:

1. In a data network comprised of a plurality of data switches that transfer data packets for a first telephone call through a first set of said switches at a predetermined rate, a method of maintaining transmission quality comprising:
   a. counting data packets received at a first switch during a predetermined time period;
   b. determining a difference between a number of data packets received at said first switch during said time period, and an expected data packet count value, the number of data packets received being adjusted for late packets and lost packets; and
   c. upon the determination that said difference between said data packets received and said expected data packet count value, exceeds a first threshold, routing successive data packets during a remaining time duration of said first telephone call through the first set of said switches and thereafter routing subsequent data packets for a subsequent telephone call through a second set of switches to maintain the transmission quality for a constant transmitted transmission rate, the remaining time duration being the time left in said first telephone call.

2. The method of claim 1 wherein said data packets are carried over an internet protocol network.

3. The method of claim 1 wherein said data packets are carried over a packet data network.

4. The method of claim 1 wherein said data packets are routed over an asynchronous transfer mode network.

5. The method of claim 1 wherein said data packets are received at a playout buffer of an internet gateway.

6. The method of claim 5 wherein said expected data packet count value is empirically determined.

7. The method of claim 1 wherein said step of routing subsequent data packets for said first telephone call through a second set of switches is instead comprised of the step of routing data packets for a second telephone call through a second set of switches.

8. The method of claim 1 wherein said expected data packet count value is variable over time.

9. The method of claim 1 wherein said data packets are delivered to said first switch at approximately 5–20 millisecond intervals.

10. The method of claim 1, further comprising:
   d. approximating said expected data packet count value by an minimum number of voice packets per unit time that produces an acceptable voice quality level.

11. The method of claim 1, further comprising:
   d. approximating said expected data packet count value by a number of voice packets that is expected per unit time over a synchronous data network for optimum voice reproduction quality.

12. An apparatus for maintaining a transmission quality of a telephone call through a network that is routed through a first set of data switches, said telephone call being represented by a series of data packets transferred at a predetermined rate over a data network, said apparatus comprising:
   a. means for counting data packets received at a first switch of said network during a predetermined time;
   b. means for determining a difference between a number of data packets received at said first switch during said time period and an expected data packet count value, the number of data packets received being adjusted for late packets and lost packets; and
   c. means for routing successive data packets during a remaining time duration of said telephone call through the first set of data switches and for rerouting subsequent data packets for a subsequent telephone call through a second set of switches upon the determination that said difference between said data packets received and said expected data packet count value, exceeds a first threshold, thereafter, to maintain the transmission quality for a constant transmitted transmission rate , the remaining time duration being the time left in said first telephone call.

13. The apparatus of claim 12 wherein said means for counting is a cell processing unit.

14. The apparatus of claim 12 wherein said means for determining the difference in the number of data packets received to an expected count value is comprised of a software based counter.

15. The apparatus of claim 12 wherein said means for determining the difference in the number of data packets received to an expected count value is comprised of a processor.

16. The apparatus of claim 12 wherein said means for re-routing data packets is comprised of a microprocessor.

17. The apparatus of claim 12 wherein said network is an asynchronous transfer mode network.

18. The apparatus of claim 12 wherein said network is a packet network.

19. The apparatus of claim 12 wherein said network is an Ethernet network.

20. The apparatus of claim 12 wherein said network is an internet protocol network.

21. The apparatus of claim 12 wherein said network is an MPLS network.

22. The apparatus of claim 12 wherein said network is a frame relay network.

23. The apparatus of claim 12 wherein said data packets arc received at a playout buffer of an internet gateway.

24. The apparatus of claim 12 wherein said expected data packet count value is variable over time.

25. A switching system that maintains a transmission quality of a telephone call through a network, the telephone call being routed through a first set of data switches and being represented by a series of data packets transferred at a predetermined rate over the network, the switching system comprising:

a data buffer that obtains received data packets through the network;

a counting module, coupled to the data buffer, that maintains a record of the received data packets, that determines a difference between a number of the received data packets and an expected data packet count value, and that adjusts the number of received data packets for late data packets and lost data packets; and a processor that is coupled to the counting module and that sets an indicator being indicative to route successive data packets during a remaining time duration of the telephone call through the first set of data switches and to reroute subsequent data packets for a subsequent telephone call through a second set of data switches if the difference exceeds a threshold to maintain the transmission quality for a constant transmitted transmission rate, the remaining time duration being the time left in said first telephone call.

26. The switching system of claim 25, wherein the network is selected from a group consisting of an asynchronous transfer mode network, a packet network, a MPLS network, and a frame relay network.

27. The switching system of claim 25, wherein the processor provides the indicator to a network controller and wherein the indicator is indicative that an alternate pathway should be associated with a subsequent telephone call.

28. The switching system of claim 25, wherein the counting module empirically determines the expected data packet count value.

29. The switching system of claim 25, wherein the data buffer obtains a next data packet approximately 5 to 20 milliseconds after obtaining a previous data packet.

* * * * *